US012778138B2

(12) United States Patent
Xia et al.

(10) Patent No.: US 12,778,138 B2
(45) **Date of Patent: *Nov. 3, 2026**

(54) METHOD OF USING/APPLYING A KERATIN HYDROLYSIS PEPTIDE SOLUTION UPON WHEAT PLANTS TO PROMOTE GROWTH AND PRODUCTION YIELD

(71) Applicant: CH Biotech R&D Co., Ltd., Nantou City (TW)

(72) Inventors: Kai Xia, Nantou (TW); Cheng-Ku Lin, Taichung (TW); Yu-Lun Liu, Taichung (TW); Nai-Hua Ye, Changhua (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 322 days.

This patent is subject to a terminal disclaimer.

(21) Appl. No.: 18/536,211

(22) Filed: Dec. 11, 2023

(65) Prior Publication Data

US 2025/0107532 A1 Apr. 3, 2025

(30) Foreign Application Priority Data

Sep. 28, 2023 (TW) ................................ 112137541

(51) Int. Cl.
*A01N 63/50* (2020.01)
*A01P 21/00* (2006.01)

(52) U.S. Cl.
CPC .............. *A01N 63/50* (2020.01); *A01P 21/00* (2021.08)

(58) Field of Classification Search
CPC ................................ A01N 63/50; A01P 21/00
See application file for complete search history.

(56) References Cited

U.S. PATENT DOCUMENTS

| | | | | |
|---|---|---|---|---|
| 8,617,282 | B2 * | 12/2013 | Szoeke | C05D 9/02 71/64.1 |
| 2025/0081910 | A1 * | 3/2025 | Huang | C05G 5/23 |
| 2025/0081964 | A1 * | 3/2025 | Chen | A01N 37/46 |
| 2025/0081965 | A1 * | 3/2025 | Chen | A01P 21/00 |
| 2025/0081972 | A1 * | 3/2025 | Xia | A01N 63/50 |
| 2025/0084010 | A1 * | 3/2025 | Xia | C05G 5/23 |
| 2025/0084134 | A1 * | 3/2025 | Xia | C05F 11/10 |
| 2025/0101072 | A1 * | 3/2025 | Chen | A01H 1/1225 |
| 2025/0113794 | A1 * | 4/2025 | Xia | G01N 33/6848 |
| 2025/0113828 | A1 * | 4/2025 | Huang | A01N 63/50 |
| 2025/0127107 | A1 * | 4/2025 | Huang | C07K 1/12 |
| 2025/0128994 | A1 * | 4/2025 | Xia | C05F 11/10 |
| 2025/0128995 | A1 * | 4/2025 | Xia | C05F 11/10 |
| 2025/0136523 | A1 * | 5/2025 | Huang | C05C 11/00 |
| 2025/0136524 | A1 * | 5/2025 | Xia | C05F 1/005 |
| 2025/0143323 | A1 * | 5/2025 | Chen | A01P 21/00 |
| 2025/0145678 | A1 * | 5/2025 | Xia | C07K 14/4741 |
| 2025/0160325 | A1 * | 5/2025 | Xia | C12P 21/06 |
| 2025/0160337 | A1 * | 5/2025 | Xia | A01N 63/50 |
| 2025/0160338 | A1 * | 5/2025 | Xia | A01N 37/46 |
| 2025/0169507 | A1 * | 5/2025 | Xia | A01N 63/50 |
| 2025/0176560 | A1 * | 6/2025 | Xia | A01P 21/00 |
| 2025/0187995 | A1 * | 6/2025 | Chen | C05F 1/005 |
| 2025/0194606 | A1 * | 6/2025 | Xia | A01P 21/00 |
| 2025/0206677 | A1 * | 6/2025 | Xia | C05F 1/005 |
| 2025/0212892 | A1 * | 7/2025 | Chen | A01N 63/50 |
| 2025/0212893 | A1 * | 7/2025 | Huang | A01P 21/00 |
| 2025/0214906 | A1 * | 7/2025 | Xia | C05C 11/00 |
| 2025/0324978 | A1 * | 10/2025 | Huang | A01N 25/02 |

FOREIGN PATENT DOCUMENTS

WO WO 2023001946 * 1/2023

OTHER PUBLICATIONS

Cheng et al. (Hydrolysis technology of biomass waste to produce amino acids in sub-critical water), Bioresource Technology, vol. 99, Jun. 2008, pp. 3337-3341. (Year: 2008).*

Yin et al, (Self-organization of oligopeptides obtained on dissolution of feather keratins in superheated water), Biomacromolecules, 2007, 8, pp. 800-806. (Year: 2007).*

Minkiewicz et al (BIOPEP-UWM database of the bioactive peptides: Current opportunities)., Int J Mol Sci. 2019, 20(23):5978, pp. 1-23. (Year: 2019).*

* cited by examiner

*Primary Examiner* — Mina Haghighatian
(74) *Attorney, Agent, or Firm* — Jen-Feng Lee, Esq.

(57) ABSTRACT

Present invention teaches the method of using a keratin hydrolysis peptide ("KHP") solution to enhance the healthy growth and production yield of wheat crops. By selectively choosing specific weights of feathers and water, and treating the mixture to a high-temperature high-pressure hydrolysis process, the resulting solution is confirmed to contain at least 253 peptides and, at early growth stage, applied to the leaf surface or infused into the soil around the crops. Optionally, the KHP solution can be diluted by water, as taught in the specification, before administering as taught herein.

8 Claims, 5 Drawing Sheets

Specification includes a Sequence Listing.

FIG. 1

| | Feathers (Kg) | Water (Kg) | Water content in Feathers % | Pressure ($Kg/cm^2$) | Temperature(°C) | Time (min) | Peptide Mass (Da) | Concentr. (ppm) |
|---|---|---|---|---|---|---|---|---|
| **KHP-2** | 66 | 44 | 50% | 16 | 195 | 40 | 593.3~3828.0 | 200000 |
| **KHP-1** | 50 | 40 | 50% | 12 | 185 | 80 | 593.3~3508.9 | 301500 |

METHOD OF USING/APPLYING A KERATIN HYDROLYSIS PEPTIDE SOLUTION UPON WHEAT PLANTS TO PROMOTE GROWTH AND PRODUCTION YIELD

PRIORITY CLAIM TO FOREIGN APPLICATION

Applicant hereby makes priority claim to a Taiwan application, number 112137541, having the Taiwan filing date of Sep. 28, 2023.

SEQUENCE LISTING/INCORPORATION BY REFERENCE

Table I (in Sequence Listing XML format) shows the at least 253 peptides and its annotated sequences for the solution generated in accordance with the disclosure of this application. The Sequence Listing XML file complies with the WIPO ST.26 requirements. Said XML copy, created on Mar. 17, 2024, is named Table-I-253_sequence and is 216 bytes in size.

Applicant hereby incorporates by reference said Sequence Listing XML file in its entirety as part of the disclosure and specification of the present application.

BACKGROUND OF THE INVENTION

Present invention disclosed and claimed the method and application of a keratin hydrolysis peptide ("KHP") solution to common wheat plant (*Triticum Aestivum*), in order to promote better growth and yield of the wheat crops.

The KHP solution is made by a hydrolysis process upon a mixture of feathers and water, at different weight ratio, via a high-temperature and high-pressure process, resulting in a solution that has many beneficial applications in the fields of horticulture, agriculture and potentially other farming businesses.

Hydrolyzed keratin has long been used to strengthen hairs, reduce breakage, and minimize damages. Some form of chemical process is used to break down the large protein molecule of the hydrolyzed keratin so that it can be better absorbed and utilized to benefit the hair and other tissues.

In the present invention, the hydrolyzed keratin is applied to wheat seedlings and young shoots, to promote healthier growth during the vegetative stage and stimulate vigorous shoot and root development, and enhance the growth of young panicles.

The common wheat plant, *Triticum Aestivum*, a species of Poaceae, Triticeae plant, is a farming crop widely planted around the world and consumed by humans as staple food items for centuries. In addition to serving as human food, the wheat crop is also used to produce animal feeds.

The wheat plants are also divided into Winter or Spring version. The Winter version plants are usually planted in the prior Fall, after experiencing the low temperatures in the winter, then the plant goes through periods of fast growth and will be harvested during Summer. The Spring version plants are planted between March and May and will be mature for harvesting in late summer of fall seasons.

In the context of global climate change, sometimes the weather is not ideal for the proper growth of wheat plants, such as extreme heat waves, or drought, or sustained rains, negatively impacting the growth and harvesting of wheats.

In recent years, Taiwan imported about 1.2 to 1.3 million tons of wheat to serve its consumption needs, in addition to the wheat production grown and harvested domestically. The lack of ideal growth and production of wheat crops has become an important agricultural and economic issues for the Taiwanese people.

It goes without saying that maintaining a high level of wheat production is essential for the sufficient need by consumer demands. To deal with these problems, the inventors of present application worked to present a way to counter the adversities and to increase the production of wheat crops, by using a high-temperature and high-pressure hydrolysis process to break down the keratin in feathers, and to form a hydrolyzed peptide solution that will help with the promotion of better growth and ultimately the increased production of wheat crops.

SUMMARY OF THE INVENTION

Given the known problems as stated above, there are existing technologies that can be used to counter the adversary conditions faced by the wheat farming industries by resorting to a solution made by keratin, and not by using fertilizers that pose inherent risks to the environment.

It is known that feather contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of *Pogostemon cablin* and *Vigna radiata*, as reported in International Journal of Recycling or Organic Waste in Agriculture (8:221-232, 2019).

Despite the limited known technique of the keratin hydrolysis by Nurdiawati, there is rarely any knowhow to apply KHP solution on agricultural crops, especially on wheat plants.

The inventors of present application, under the aegis of CH Biotech, developed a method of creating a keratin solution and method of applying the solution for applying to the wheat plants at different growth cycles/stages, and proved by experiments that such a method in fact helped with the increase of wheat crop production.

The keratin hydrolysis peptide ("KHP") solution of present invention has two embodiments based upon the weight ratio between feathers and water. One embodiment uses 66 kg of feathers mixed with 44 kg of water; the other embodiment uses 50 kg of feathers mixed with 40 kg of water. The feathers have a water content of 50%.

The mixture then is treated by a high-temperature and high-pressure process as further described below.

The KHP solution obtained contains contain at least 253 peptides as listed in and confirmed using a mass spectrometer and referencing the BIOPEP-UWM database, their molecular masses are between 500 and 4,000 Daltons, and the concentration is in the range of $2.0\times10^5$~$4.5\times10^5$ ppm;

The solution is applied to the soil around wheat plants at seedling stage and/or at vegetative stage.

The method of using a keratin hydrolysis peptide (KHP) solution is applied to the leaf surface of wheat plants.

The method of using a keratin hydrolysis peptide (KHP) solution can be further diluted with water by volume at the ratio of 1:100-1000 and is applied to the leaf surface of wheat plants.

The method of using a keratin hydrolysis peptide (KHP) solution can be further diluted with water by volume at the ratio of 1:50-500 and is applied to soil around the wheat plants.

A second embodiment method of using a keratin hydrolysis peptide (KHP) solution by mixing 50 kg of feathers whose content is 50% water and 40 kg of water. The temperature and pressure settings are 185 °C and 12 kg/cm$^2$; for a duration of 80 minutes The same methods of applying the second embodiment solution are the same as the first embodiment solution.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

FIG. 1 shows the parameters of the hydrolysis for the two embodiments.

DETAILED DESCRIPTION OF THE INVENTION

Figure 2A:
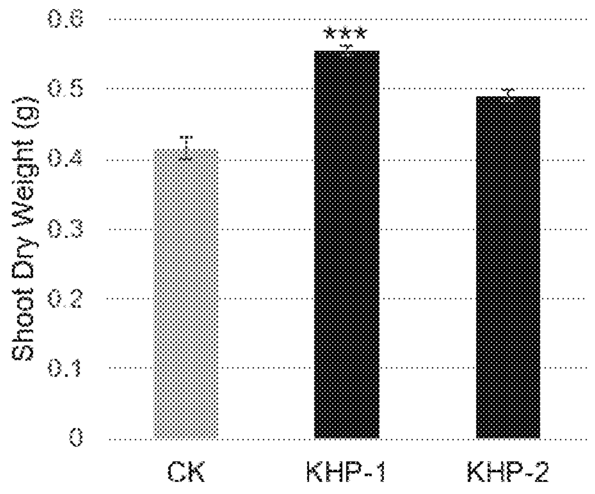
FIG. 2A shows the comparisons of wheat plants measured by the shoot weight after applying two embodiments (KHP-1 and KHP-2) solutions with 500 times dilution.

The keratin hydrolysis peptide ("KHP") solution of present invention has two embodiments based upon the weight ratio between feathers and water. One embodiment uses 66 kg of feathers mixed with 44 kg of water; the other embodiment uses 50 kg of feathers mixed with 40 kg of water. The feathers have a water content of 50%.

The mixture then is treated by a high-temperature and high-pressure process as further described below.

In a first embodiment method of the KHP solution using on wheat plants to promote the growth and the eventual crop yield, comprising the steps of:

a. Preparing the KHP solution by mixing 66 kg of feathers whose content is 50% water and 44 kg of water in a sealed container;
b. hydrolyzing the mixture in the container with a temperature and pressure setting of 195 °C and 16 kg/cm$^2$ for a duration of 40 minutes;
c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm;
d. applying the solution to the soil around wheat plants at seedling stage and/or at vegetative stage.

To confirm the 253 peptides, the inventors used a Dionex UltiMate 3000 UPLC to separate the peptides; an analysis is done via Thermo Orbitrap Fushion Lumos Tribrid Orbitrap mass spectrometry to identify the peptides, which are then subsequently confirmed by looking up the BIOPEP-UWM database.

The method of using a keratin hydrolysis peptide (KHP) solution stated above where the solution is applied to the leaf surface of wheat plants.

The method of using a keratin hydrolysis peptide (KHP) solution stated above where the solution is diluted with water by volume at the ratio of 1:100-1000 and is applied to the leaf surface of wheat plants.

The method of using a keratin hydrolysis peptide (KHP) solution stated above 1 where the solution is diluted with water by volume at the ratio of 1:50-500 and is applied to soil around the wheat plants.

A second embodiment method of using a keratin hydrolysis peptide (KHP) solution to wheat plants promote the growth and the eventual crop yield, comprising the steps of:

a. Preparing the KHP solution by mixing 50 kg of feathers whose content is 50% water and 40 kg of water together in a sealed container;
b. hydrolyzing the mixture in the container with a temperature and pressure setting of 185 °C and 12 kg/cm$^2$ for a duration of 80 minutes;
c. using a mass spectrometer to confirm the combination of peptides in the solution to contain at least 253 peptides as listed in the specification where their molecular masses are between 500 and 4,000 Daltons, and the concentration is in the range of $3.0\times10^5$~$4.5\times10^5$ ppm;
d. applying the solution to the soil around wheat plants at seedling stage and/or at vegetative stage.

The method of using a keratin hydrolysis peptide (KHP) solution stated above where the solution is applied to the leaf surface of wheat plants.

The method of using a keratin hydrolysis peptide (KHP) solution stated above where the solution is diluted with water by volume at the ratio of 1:100-1000 and is applied to the leaf surface of wheat plants.

The method of using a keratin hydrolysis peptide (KHP) solution stated above where the solution is diluted with water by volume at the ratio of 1:50-500 and is applied to soil around the wheat plants.

The inventors of present application conducted field test on the wheat plants and confirmed the effectiveness of the invention disclosed and claimed herein.

The wheat species of *Triticum aestivum* is selected to conduct the experiments. Samples of healthy seeds are planted roughly 2 cm deep into cultivation pots, with temperature set at 25 °C, sun exposure time at 16 hours per day, 8 hours night time, and illumination at 35000 lux.

Fifteen days after seeding, two groups of wheat plants' leaf surfaces are sprayed with the two solution embodiments, noted as KHP-1 and KHP-2, and a check group, noted as CK, is given normal nutrients without the KHP solutions.

The solutions are diluted with water at a ratio of 1:500 by volume when applied to the two KHP groups. For the dilution ratio other than 500, the ratios are specifically noted.

As shown in the FIGS. 2-5, different measures taken from the stem portion and the root portion confirmed the enhancement of the wheat's growth and the ultimate increase for the yield.

Checking the chlorophyll count by SPAD instrument (2900PDL, Specturm Technologies and taking the precise weight measurement with a digital scale (AP224X, Shimadazu), the results are summarized in FIGS. 2-5.

Figure 2B:
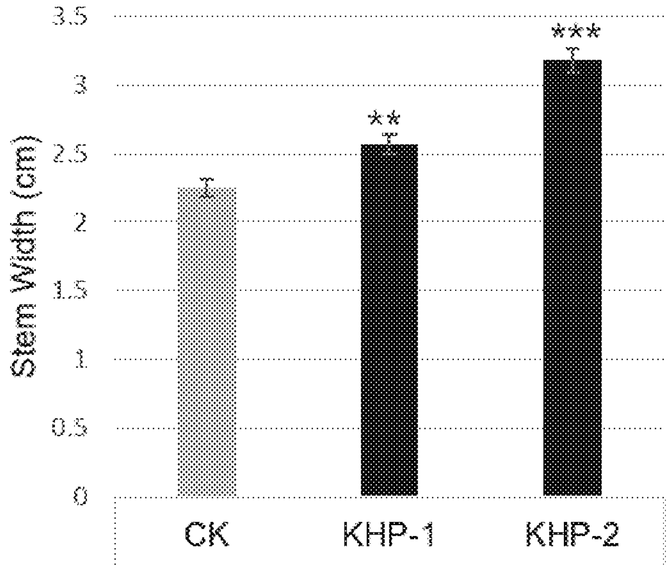
FIG. 2B shows the comparisons of wheat plants measured by the shoot width after applying two embodiments (KHP-1 and KHP-2) solutions with 500 times dilution.

FIG. 2 shows the comparisons of a check group as opposed to the other two groups where the KHP solutions, KHP-1 and KHP-2, diluted 500 times, were sprayed to the leaf surface at early growth stage. The weight and the width of the young stems (above ground) were measured, 7 days after the spraying, and shown in FIG. 2A and FIG. 2B respectively.

Figure 3A:
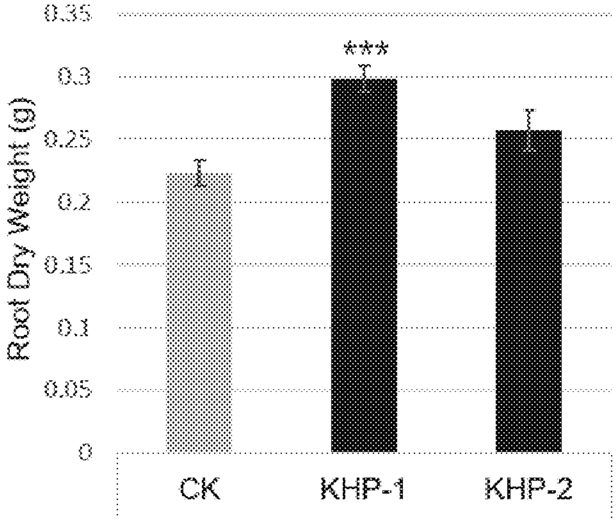
FIG. 3A shows the comparisons of wheat plants measured by the root weight after applying two embodiments (KHP-1 and KHP-2) solutions with 500 times dilution.
Figure 3B:
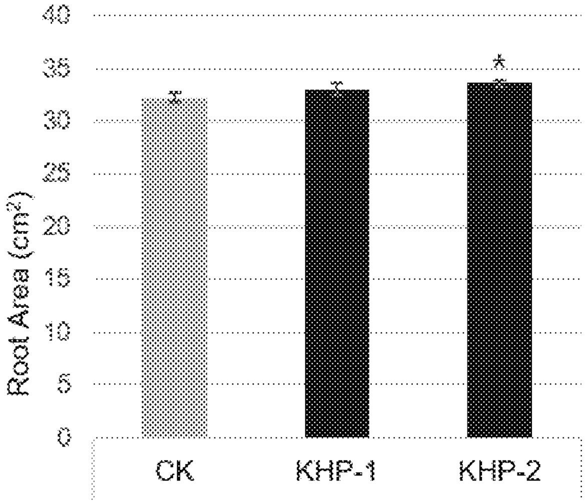
FIG. 3B shows the comparisons of wheat plants measured by the root area after applying two embodiments (KHP-1 and KHP-2) solutions with 500 times dilution.

FIG. 3 shows the comparisons of a check group as opposed to the other two group where the KHP solutions, KHP-1 and KHP-2, diluted 500 times, were sprayed to the leaf surface at early growth stage. The weight and area of young roots were measured (after taken out from soil, cleaned and dried), 7 days after the spraying, and shown in FIG. 3A and FIG. 3B.

Figure 4:
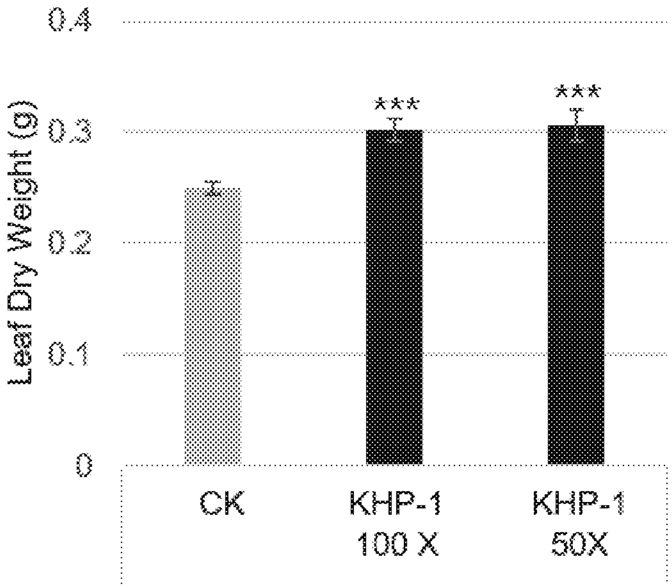
FIG. 4 shows the comparisons of wheat plants measured by leaf weight, only with KHP-1 solution by diluted at 100 times and 50 times respectively.

FIG. 4 shows the comparisons of a check group as opposed to the two other groups using only KHP-1 (diluted 100 times and diluted 50 times respectively), were infused to the soil around the wheat plants. The weight of leaves (the same count taken from each group) is then measured, 15 days after the infusion, and shown in FIG. 4.

Figure 5A:
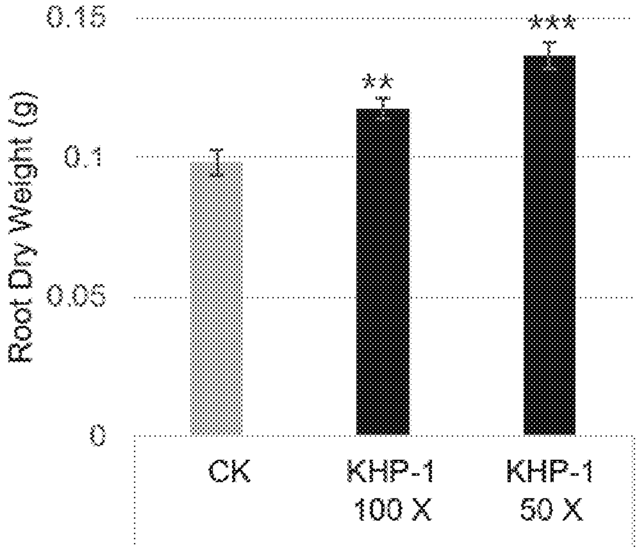
FIG. 5A shows the comparisons of wheat plants measure by root weight, only with KHP-1 solution, diluted at 100 times and 50 times respectively.
Figure 5B:
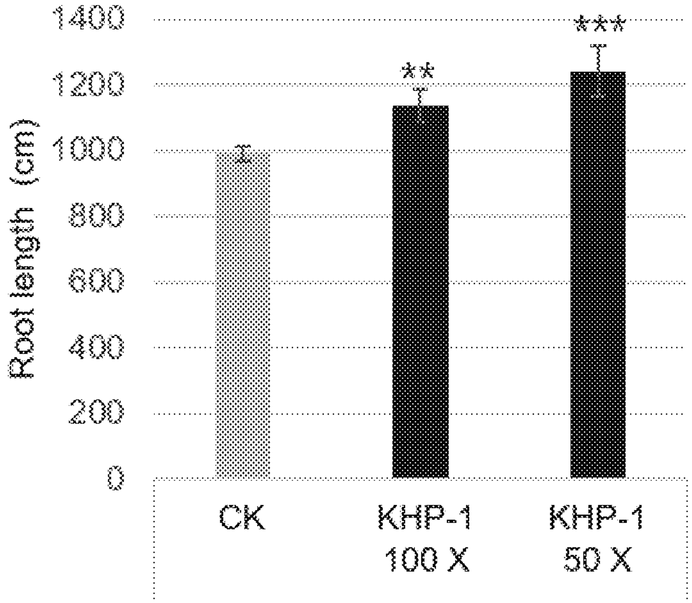
FIG. 5B shows the comparisons of wheat plants measure by root length, only with KHP-1 solution, diluted at 100 times and 50 times respectively.

FIG. 5 shows the comparisons of a check group as opposed to the two other groups using only KHP-1 (diluted 100 times and diluted 50 times respectively), were infused to the soil around the wheat plants. The weight and length of young roots were measured (after taken out from soil, cleaned and dried), 15 days after the infusion, and shown in FIG. 5A and FIG. 5B.

The experiments done, in accordance with the method disclosed herein, proved that the KHP-1 and KHP-2 groups, at the various dilution ratios, attain substantially better growth results for the wheat plants than the check group where only water and normal nutrients were given under the same conditions.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution on wheat plants to promote the growth and the eventual crop yield, comprising the steps of:

a. Preparing the KHP solution by mixing 66 kg of feathers whose content is 50% water and 44 kg of water in a sealed container;

b. hydrolyzing the mixture in the container with a temperature and pressure setting of 195 °C and 16 kg/$cm^2$ for a duration of 40 minutes;

c. using a mass spectrometer to confirm the combination of peptides in the solution to contain 253 peptides as listed in the specification where their molecular masses are between 500 and 4,000 Daltons, and the concentration is in the range of $2.0\times10^5$~$4.5\times10^5$ ppm;

d. applying the solution to the soil around wheat plants at seedling stage.

2. The method of using a keratin hydrolysis peptide (KHP) solution of claim 1, where the solution is diluted with water by volume at the ratio of 1:50-500.

3. A method of using a keratin hydrolysis peptide (KHP) solution on wheat plants to promote the growth and the eventual crop yield, comprising the steps of:

a. Preparing the KHP solution by mixing 66 kg of feathers whose content is 50% water and 44 kg of water in a sealed container;

b. hydrolyzing the mixture in the container with a temperature and pressure setting of 195 °C and 16 kg/$cm^2$ for a duration of 40 minutes;

c. using a mass spectrometer to confirm the combination of peptides in the solution to contain 253 peptides as listed in the specification where their molecular masses are between 500 and 4,000 Daltons, and the concentration is in the range of $2.0\times10^5$~$4.5\times10^5$ ppm;

d. applying the solution to leaf surface of wheat plants at vegetative stage.

4. The method of using a keratin hydrolysis peptide (KHP) solution of claim 3, where the solution is diluted with water by volume at the ratio of 1:100-1000.

5. A method of using a keratin hydrolysis peptide (KHP) solution on wheat plants to promote the growth and the eventual crop yield, comprising the steps of:

a. Preparing the KHP solution by mixing 50 kg of feathers whose content is 50% water and 40 kg of water together in a sealed container;

b. hydrolyzing the mixture in the container with a temperature and pressure setting of 185 °C and 12 kg/$cm^2$ for a duration of 80 minutes;

c. using a mass spectrometer to confirm the combination of peptides in the solution to contain 253 peptides as listed in the specification where their molecular masses are between 500 and 4,000 Daltons, and the concentration is in the range of $3.0\times10^5$~$4.5\times10^5$ ppm;

d. applying the solution to the soil around wheat plants at seedling stage.

6. The method of using a keratin hydrolysis peptide (KHP) solution of claim 5, where the solution is diluted with water by volume at the ratio of 1:50-500.

7. A method of using a keratin hydrolysis peptide (KHP) solution on wheat plants to promote the growth and the eventual crop yield, comprising the steps of:

a. Preparing the KHP solution by mixing 50 kg of feathers whose content is 50% water and 40 kg of water together in a sealed container;

b. hydrolyzing the mixture in the container with a temperature and pressure setting of 185 °C and 12 kg/$cm^2$ for a duration of 80 minutes;

c. using a mass spectrometer to confirm the combination of peptides in the solution to contain 253 peptides as listed in the specification where their molecular masses are between 500 and 4,000 Daltons, and the concentration is in the range of $3.0\times10^5$~$4.5\times10^5$ ppm;

d. applying the solution to leaf surface of wheat plants at vegetative stage.

8. The method of using a keratin hydrolysis peptide (KHP) solution of claim 7, where the solution is diluted with water by volume at the ratio of 1:100-1000.

* * * * *

SEQUENCE LISTING

```
Sequence total quantity: 253
SEQ ID NO: 1            moltype = AA  length = 6
FEATURE                 Location/Qualifiers
source                  1..6
                        mol_type = protein
                        organism = Gallus gallus
SEQUENCE: 1
FGLSGL                                                            6

SEQ ID NO: 2            moltype = AA  length = 7
FEATURE                 Location/Qualifiers
source                  1..7
                        mol_type = protein
                        organism = Gallus gallus
SEQUENCE: 2
AAVGSSL                                                           7

SEQ ID NO: 3            moltype = AA  length = 7
FEATURE                 Location/Qualifiers
source                  1..7
                        mol_type = protein
                        organism = Gallus gallus
SEQUENCE: 3
TAVGSST                                                           7

SEQ ID NO: 4            moltype = AA  length = 6
FEATURE                 Location/Qualifiers
source                  1..6
                        mol_type = protein
                        organism = Gallus gallus
SEQUENCE: 4
LSLSSQ                                                            6

SEQ ID NO: 5            moltype = AA  length = 7
FEATURE                 Location/Qualifiers
source                  1..7
                        mol_type = protein
                        organism = Gallus gallus
SEQUENCE: 5
FGISGLG                                                           7

SEQ ID NO: 6            moltype = AA  length = 6
FEATURE                 Location/Qualifiers
source                  1..6
                        mol_type = protein
```

```
                        organism = Gallus gallus
SEQUENCE: 6
PILSSF                                                                    6

SEQ ID NO: 7            moltype = AA  length = 7
FEATURE                 Location/Qualifiers
source                  1..7
                        mol_type = protein
                        organism = Gallus gallus
SEQUENCE: 7
SLLSQGA                                                                   7

SEQ ID NO: 8            moltype = AA  length = 6
FEATURE                 Location/Qualifiers
source                  1..6
                        mol_type = protein
                        organism = Gallus gallus
SEQUENCE: 8
FNLRGA                                                                    6

SEQ ID NO: 9            moltype = AA  length = 8
FEATURE                 Location/Qualifiers
source                  1..8
                        mol_type = protein
                        organism = Gallus gallus
SEQUENCE: 9
SAAVGSSL                                                                  8

SEQ ID NO: 10           moltype = AA  length = 6
FEATURE                 Location/Qualifiers
source                  1..6
                        mol_type = protein
                        organism = Gallus gallus
SEQUENCE: 10
SRVVIQ                                                                    6

SEQ ID NO: 11           moltype = AA  length = 6
FEATURE                 Location/Qualifiers
source                  1..6
                        mol_type = protein
                        organism = Gallus gallus
SEQUENCE: 11
SRVVLE                                                                    6

SEQ ID NO: 12           moltype = AA  length = 8
FEATURE                 Location/Qualifiers
source                  1..8
                        mol_type = protein
                        organism = Gallus gallus
SEQUENCE: 12
GFGISGLG                                                                  8

SEQ ID NO: 13           moltype = AA  length = 6
FEATURE                 Location/Qualifiers
source                  1..6
                        mol_type = protein
                        organism = Gallus gallus
SEQUENCE: 13
SRFSGR                                                                    6

SEQ ID NO: 14           moltype = AA  length = 6
FEATURE                 Location/Qualifiers
source                  1..6
                        mol_type = protein
                        organism = Gallus gallus
SEQUENCE: 14
RVVIQP                                                                    6

SEQ ID NO: 15           moltype = AA  length = 8
FEATURE                 Location/Qualifiers
source                  1..8
                        mol_type = protein
                        organism = Gallus gallus
SEQUENCE: 15
SAAVGSIL                                                                  8

SEQ ID NO: 16           moltype = AA  length = 7
FEATURE                 Location/Qualifiers
source                  1..7
```

-continued

```
                        mol_type = protein
                        organism = Gallus gallus
SEQUENCE: 16
IVVIGHV                                                                7

SEQ ID NO: 17           moltype = AA  length = 9
FEATURE                 Location/Qualifiers
source                  1..9
                        mol_type = protein
                        organism = Gallus gallus
SEQUENCE: 17
TAVGSSTSA                                                              9

SEQ ID NO: 18           moltype = AA  length = 7
FEATURE                 Location/Qualifiers
source                  1..7
                        mol_type = protein
                        organism = Gallus gallus
SEQUENCE: 18
RVVIQPS                                                                7

SEQ ID NO: 19           moltype = AA  length = 7
FEATURE                 Location/Qualifiers
source                  1..7
                        mol_type = protein
                        organism = Gallus gallus
SEQUENCE: 19
SRVVIQP                                                                7

SEQ ID NO: 20           moltype = AA  length = 7
FEATURE                 Location/Qualifiers
source                  1..7
                        mol_type = protein
                        organism = Gallus gallus
SEQUENCE: 20
PQGEQLQ                                                                7

SEQ ID NO: 21           moltype = AA  length = 9
FEATURE                 Location/Qualifiers
source                  1..9
                        mol_type = protein
                        organism = Gallus gallus
SEQUENCE: 21
RAGAGPPSP                                                              9

SEQ ID NO: 22           moltype = AA  length = 7
FEATURE                 Location/Qualifiers
source                  1..7
                        mol_type = protein
                        organism = Gallus gallus
SEQUENCE: 22
DSRVVIQ                                                                7

SEQ ID NO: 23           moltype = AA  length = 8
FEATURE                 Location/Qualifiers
source                  1..8
                        mol_type = protein
                        organism = Gallus gallus
SEQUENCE: 23
PGPILSSF                                                               8

SEQ ID NO: 24           moltype = AA  length = 9
FEATURE                 Location/Qualifiers
source                  1..9
                        mol_type = protein
                        organism = Gallus gallus
SEQUENCE: 24
PISSGGFGI                                                              9

SEQ ID NO: 25           moltype = AA  length = 8
FEATURE                 Location/Qualifiers
source                  1..8
                        mol_type = protein
                        organism = Gallus gallus
SEQUENCE: 25
ISGLGSRF                                                               8

SEQ ID NO: 26           moltype = AA  length = 10
FEATURE                 Location/Qualifiers
```

```
source                  1..10
                        mol_type = protein
                        organism = Gallus gallus
SEQUENCE: 26
SGGFGISGLG                                                            10

SEQ ID NO: 27           moltype = AA  length = 7
FEATURE                 Location/Qualifiers
source                  1..7
                        mol_type = protein
                        organism = Gallus gallus
SEQUENCE: 27
SRFSGRR                                                               7

SEQ ID NO: 28           moltype = AA  length = 9
FEATURE                 Location/Qualifiers
source                  1..9
                        mol_type = protein
                        organism = Gallus gallus
SEQUENCE: 28
PGLALPVLP                                                             9

SEQ ID NO: 29           moltype = AA  length = 8
FEATURE                 Location/Qualifiers
source                  1..8
                        mol_type = protein
                        organism = Gallus gallus
SEQUENCE: 29
SRVVIQPS                                                              8

SEQ ID NO: 30           moltype = AA  length = 8
FEATURE                 Location/Qualifiers
source                  1..8
                        mol_type = protein
                        organism = Gallus gallus
SEQUENCE: 30
PILSSFPQ                                                              8

SEQ ID NO: 31           moltype = AA  length = 8
FEATURE                 Location/Qualifiers
source                  1..8
                        mol_type = protein
                        organism = Gallus gallus
SEQUENCE: 31
LGSGIFWI                                                              8

SEQ ID NO: 32           moltype = AA  length = 9
FEATURE                 Location/Qualifiers
source                  1..9
                        mol_type = protein
                        organism = Gallus gallus
SEQUENCE: 32
GISGLGSRF                                                             9

SEQ ID NO: 33           moltype = AA  length = 9
FEATURE                 Location/Qualifiers
source                  1..9
                        mol_type = protein
                        organism = Gallus gallus
SEQUENCE: 33
VVVTLPGPI                                                             9

SEQ ID NO: 34           moltype = AA  length = 8
FEATURE                 Location/Qualifiers
source                  1..8
                        mol_type = protein
                        organism = Gallus gallus
SEQUENCE: 34
CRLSLSQP                                                              8

SEQ ID NO: 35           moltype = AA  length = 11
FEATURE                 Location/Qualifiers
source                  1..11
                        mol_type = protein
                        organism = Gallus gallus
SEQUENCE: 35
SAAVGSSLSA G                                                          11

SEQ ID NO: 36           moltype = AA  length = 11
```

-continued

```
FEATURE                Location/Qualifiers
source                 1..11
                       mol_type = protein
                       organism = Gallus gallus
SEQUENCE: 36
AVGSSTSAAV G                                                11

SEQ ID NO: 37          moltype = AA  length = 9
FEATURE                Location/Qualifiers
source                 1..9
                       mol_type = protein
                       organism = Gallus gallus
SEQUENCE: 37
VVTLPGPIL                                                   9

SEQ ID NO: 38          moltype = AA  length = 9
FEATURE                Location/Qualifiers
source                 1..9
                       mol_type = protein
                       organism = Gallus gallus
SEQUENCE: 38
PGPILSSFP                                                   9

SEQ ID NO: 39          moltype = AA  length = 10
FEATURE                Location/Qualifiers
source                 1..10
                       mol_type = protein
                       organism = Gallus gallus
SEQUENCE: 39
SAAVGSILSE                                                  10

SEQ ID NO: 40          moltype = AA  length = 10
FEATURE                Location/Qualifiers
source                 1..10
                       mol_type = protein
                       organism = Gallus gallus
SEQUENCE: 40
VPISSGGFGI                                                  10

SEQ ID NO: 41          moltype = AA  length = 8
FEATURE                Location/Qualifiers
source                 1..8
                       mol_type = protein
                       organism = Gallus gallus
SEQUENCE: 41
QLAQRNTI                                                    8

SEQ ID NO: 42          moltype = AA  length = 9
FEATURE                Location/Qualifiers
source                 1..9
                       mol_type = protein
                       organism = Gallus gallus
SEQUENCE: 42
LSGLRSNLS                                                   9

SEQ ID NO: 43          moltype = AA  length = 10
FEATURE                Location/Qualifiers
source                 1..10
                       mol_type = protein
                       organism = Gallus gallus
SEQUENCE: 43
PSPVVVTLPG                                                  10

SEQ ID NO: 44          moltype = AA  length = 10
FEATURE                Location/Qualifiers
source                 1..10
                       mol_type = protein
                       organism = Gallus gallus
SEQUENCE: 44
PPPVVVTLPG                                                  10

SEQ ID NO: 45          moltype = AA  length = 10
FEATURE                Location/Qualifiers
source                 1..10
                       mol_type = protein
                       organism = Gallus gallus
SEQUENCE: 45
ISGLGSRFSG                                                  10
```

```
SEQ ID NO: 46           moltype = AA  length = 9
FEATURE                 Location/Qualifiers
source                  1..9
                        mol_type = protein
                        organism = Gallus gallus
SEQUENCE: 46
LALRQSVEA                                                                9

SEQ ID NO: 47           moltype = AA  length = 10
FEATURE                 Location/Qualifiers
source                  1..10
                        mol_type = protein
                        organism = Gallus gallus
SEQUENCE: 47
PLLGPPLLGI                                                               10

SEQ ID NO: 48           moltype = AA  length = 10
FEATURE                 Location/Qualifiers
source                  1..10
                        mol_type = protein
                        organism = Gallus gallus
SEQUENCE: 48
VVTLPGPILS                                                               10

SEQ ID NO: 49           moltype = AA  length = 8
FEATURE                 Location/Qualifiers
source                  1..8
                        mol_type = protein
                        organism = Gallus gallus
SEQUENCE: 49
VTLEDLRR                                                                 8

SEQ ID NO: 50           moltype = AA  length = 9
FEATURE                 Location/Qualifiers
source                  1..9
                        mol_type = protein
                        organism = Gallus gallus
SEQUENCE: 50
PILSSFPQN                                                                9

SEQ ID NO: 51           moltype = AA  length = 9
FEATURE                 Location/Qualifiers
source                  1..9
                        mol_type = protein
                        organism = Gallus gallus
SEQUENCE: 51
PILSSFPQD                                                                9

SEQ ID NO: 52           moltype = AA  length = 11
FEATURE                 Location/Qualifiers
source                  1..11
                        mol_type = protein
                        organism = Gallus gallus
SEQUENCE: 52
GTVGVSAGVT R                                                             11

SEQ ID NO: 53           moltype = AA  length = 9
FEATURE                 Location/Qualifiers
source                  1..9
                        mol_type = protein
                        organism = Gallus gallus
SEQUENCE: 53
FGLSRVTLN                                                                9

SEQ ID NO: 54           moltype = AA  length = 12
FEATURE                 Location/Qualifiers
source                  1..12
                        mol_type = protein
                        organism = Gallus gallus
SEQUENCE: 54
TAVGSSTSAA VG                                                            12

SEQ ID NO: 55           moltype = AA  length = 10
FEATURE                 Location/Qualifiers
source                  1..10
                        mol_type = protein
                        organism = Gallus gallus
SEQUENCE: 55
VVVTLPGPIL                                                               10
```

```
SEQ ID NO: 56           moltype = AA  length = 10
FEATURE                 Location/Qualifiers
source                  1..10
                        mol_type = protein
                        organism = Gallus gallus
SEQUENCE: 56
PPVVVTFPGP                                                            10

SEQ ID NO: 57           moltype = AA  length = 10
FEATURE                 Location/Qualifiers
source                  1..10
                        mol_type = protein
                        organism = Gallus gallus
SEQUENCE: 57
PPPVVVTFPG                                                            10

SEQ ID NO: 58           moltype = AA  length = 10
FEATURE                 Location/Qualifiers
source                  1..10
                        mol_type = protein
                        organism = Gallus gallus
SEQUENCE: 58
VVIQPSPVVV                                                            10

SEQ ID NO: 59           moltype = AA  length = 10
FEATURE                 Location/Qualifiers
source                  1..10
                        mol_type = protein
                        organism = Gallus gallus
SEQUENCE: 59
FGISGLGSRF                                                            10

SEQ ID NO: 60           moltype = AA  length = 10
FEATURE                 Location/Qualifiers
source                  1..10
                        mol_type = protein
                        organism = Gallus gallus
SEQUENCE: 60
PGPILSSFPQ                                                            10

SEQ ID NO: 61           moltype = AA  length = 10
FEATURE                 Location/Qualifiers
source                  1..10
                        mol_type = protein
                        organism = Gallus gallus
SEQUENCE: 61
FGWSGLGRGL                                                            10

SEQ ID NO: 62           moltype = AA  length = 9
FEATURE                 Location/Qualifiers
source                  1..9
                        mol_type = protein
                        organism = Gallus gallus
SEQUENCE: 62
LEAQLSELR                                                             9

SEQ ID NO: 63           moltype = AA  length = 9
FEATURE                 Location/Qualifiers
source                  1..9
                        mol_type = protein
                        organism = Gallus gallus
SEQUENCE: 63
IVGAWYTVR                                                             9

SEQ ID NO: 64           moltype = AA  length = 11
FEATURE                 Location/Qualifiers
source                  1..11
                        mol_type = protein
                        organism = Gallus gallus
SEQUENCE: 64
LLSPPGLPGL L                                                          11

SEQ ID NO: 65           moltype = AA  length = 11
FEATURE                 Location/Qualifiers
source                  1..11
                        mol_type = protein
                        organism = Gallus gallus
SEQUENCE: 65
```

```
VVVTLPGPIL S                                                          11

SEQ ID NO: 66          moltype = AA  length = 11
FEATURE                Location/Qualifiers
source                 1..11
                       mol_type = protein
                       organism = Gallus gallus
SEQUENCE: 66
GFGISGLGSR F                                                          11

SEQ ID NO: 67          moltype = AA  length = 11
FEATURE                Location/Qualifiers
source                 1..11
                       mol_type = protein
                       organism = Gallus gallus
SEQUENCE: 67
PVVVTLPGPI L                                                          11

SEQ ID NO: 68          moltype = AA  length = 11
FEATURE                Location/Qualifiers
source                 1..11
                       mol_type = protein
                       organism = Gallus gallus
SEQUENCE: 68
VSQGEITVPS I                                                          11

SEQ ID NO: 69          moltype = AA  length = 11
FEATURE                Location/Qualifiers
source                 1..11
                       mol_type = protein
                       organism = Gallus gallus
SEQUENCE: 69
SILSEEGVPI S                                                          11

SEQ ID NO: 70          moltype = AA  length = 11
FEATURE                Location/Qualifiers
source                 1..11
                       mol_type = protein
                       organism = Gallus gallus
SEQUENCE: 70
PVVVTFPGPI L                                                          11

SEQ ID NO: 71          moltype = AA  length = 13
FEATURE                Location/Qualifiers
source                 1..13
                       mol_type = protein
                       organism = Gallus gallus
SEQUENCE: 71
PISSGGFGIS GLG                                                        13

SEQ ID NO: 72          moltype = AA  length = 13
FEATURE                Location/Qualifiers
source                 1..13
                       mol_type = protein
                       organism = Gallus gallus
SEQUENCE: 72
VGSSTSAAVG SIL                                                        13

SEQ ID NO: 73          moltype = AA  length = 11
FEATURE                Location/Qualifiers
source                 1..11
                       mol_type = protein
                       organism = Gallus gallus
SEQUENCE: 73
GFLSSAVSLN R                                                          11

SEQ ID NO: 74          moltype = AA  length = 12
FEATURE                Location/Qualifiers
source                 1..12
                       mol_type = protein
                       organism = Gallus gallus
SEQUENCE: 74
GGFGISGLGS RF                                                         12

SEQ ID NO: 75          moltype = AA  length = 11
FEATURE                Location/Qualifiers
source                 1..11
                       mol_type = protein
                       organism = Gallus gallus
```

```
SEQUENCE: 75
PGPILSSFPQ N                                                    11

SEQ ID NO: 76          moltype = AA  length = 11
FEATURE                Location/Qualifiers
source                 1..11
                       mol_type = protein
                       organism = Gallus gallus
SEQUENCE: 76
PGPILSSFPQ D                                                    11

SEQ ID NO: 77          moltype = AA  length = 12
FEATURE                Location/Qualifiers
source                 1..12
                       mol_type = protein
                       organism = Gallus gallus
SEQUENCE: 77
GGFGWSGLGR GL                                                   12

SEQ ID NO: 78          moltype = AA  length = 12
FEATURE                Location/Qualifiers
source                 1..12
                       mol_type = protein
                       organism = Gallus gallus
SEQUENCE: 78
PSPVVVTLPG PI                                                   12

SEQ ID NO: 79          moltype = AA  length = 12
FEATURE                Location/Qualifiers
source                 1..12
                       mol_type = protein
                       organism = Gallus gallus
SEQUENCE: 79
VVVTLPGPIL SS                                                   12

SEQ ID NO: 80          moltype = AA  length = 12
FEATURE                Location/Qualifiers
source                 1..12
                       mol_type = protein
                       organism = Gallus gallus
SEQUENCE: 80
PVVVTLPGPI LS                                                   12

SEQ ID NO: 81          moltype = AA  length = 12
FEATURE                Location/Qualifiers
source                 1..12
                       mol_type = protein
                       organism = Gallus gallus
SEQUENCE: 81
SPVVVTLPGP IL                                                   12

SEQ ID NO: 82          moltype = AA  length = 11
FEATURE                Location/Qualifiers
source                 1..11
                       mol_type = protein
                       organism = Gallus gallus
SEQUENCE: 82
RVVIQPSPVV V                                                    11

SEQ ID NO: 83          moltype = AA  length = 11
FEATURE                Location/Qualifiers
source                 1..11
                       mol_type = protein
                       organism = Gallus gallus
SEQUENCE: 83
QALTEVYAKA N                                                    11

SEQ ID NO: 84          moltype = AA  length = 10
FEATURE                Location/Qualifiers
source                 1..10
                       mol_type = protein
                       organism = Gallus gallus
SEQUENCE: 84
IETLTQFLGW                                                      10

SEQ ID NO: 85          moltype = AA  length = 13
FEATURE                Location/Qualifiers
source                 1..13
                       mol_type = protein
```

```
                          organism = Gallus gallus
SEQUENCE: 85
GFGSRSLVGL GGT                                                                  13

SEQ ID NO: 86             moltype = AA  length = 14
FEATURE                   Location/Qualifiers
source                    1..14
                          mol_type = protein
                          organism = Gallus gallus
SEQUENCE: 86
AVGSSTSAAV GSIL                                                                 14

SEQ ID NO: 87             moltype = AA  length = 12
FEATURE                   Location/Qualifiers
source                    1..12
                          mol_type = protein
                          organism = Gallus gallus
SEQUENCE: 87
PVVVTFPGPI LS                                                                   12

SEQ ID NO: 88             moltype = AA  length = 14
FEATURE                   Location/Qualifiers
source                    1..14
                          mol_type = protein
                          organism = Gallus gallus
SEQUENCE: 88
VGSSTSAAVG SILS                                                                 14

SEQ ID NO: 89             moltype = AA  length = 13
FEATURE                   Location/Qualifiers
source                    1..13
                          mol_type = protein
                          organism = Gallus gallus
SEQUENCE: 89
GFGISGLGSR FSG                                                                  13

SEQ ID NO: 90             moltype = AA  length = 13
FEATURE                   Location/Qualifiers
source                    1..13
                          mol_type = protein
                          organism = Gallus gallus
SEQUENCE: 90
SGGFGISGLG SRF                                                                  13

SEQ ID NO: 91             moltype = AA  length = 14
FEATURE                   Location/Qualifiers
source                    1..14
                          mol_type = protein
                          organism = Gallus gallus
SEQUENCE: 91
VPISSGGFGI SGLG                                                                 14

SEQ ID NO: 92             moltype = AA  length = 12
FEATURE                   Location/Qualifiers
source                    1..12
                          mol_type = protein
                          organism = Gallus gallus
SEQUENCE: 92
VVIQPSPVVV TL                                                                   12

SEQ ID NO: 93             moltype = AA  length = 13
FEATURE                   Location/Qualifiers
source                    1..13
                          mol_type = protein
                          organism = Gallus gallus
SEQUENCE: 93
SILSEEGVPI SSG                                                                  13

SEQ ID NO: 94             moltype = AA  length = 13
FEATURE                   Location/Qualifiers
source                    1..13
                          mol_type = protein
                          organism = Gallus gallus
SEQUENCE: 94
VMGCKAAGAS RII                                                                  13

SEQ ID NO: 95             moltype = AA  length = 13
FEATURE                   Location/Qualifiers
source                    1..13
```

```
                        mol_type = protein
                        organism = Gallus gallus
SEQUENCE: 95
SPVVVTLPGP ILS                                                   13

SEQ ID NO: 96           moltype = AA  length = 12
FEATURE                 Location/Qualifiers
source                  1..12
                        mol_type = protein
                        organism = Gallus gallus
SEQUENCE: 96
SRVVIQPSPV VV                                                    12

SEQ ID NO: 97           moltype = AA  length = 13
FEATURE                 Location/Qualifiers
source                  1..13
                        mol_type = protein
                        organism = Gallus gallus
SEQUENCE: 97
PSPVVVTLPG PIL                                                   13

SEQ ID NO: 98           moltype = AA  length = 12
FEATURE                 Location/Qualifiers
source                  1..12
                        mol_type = protein
                        organism = Gallus gallus
SEQUENCE: 98
RVVIQPSPVV VT                                                    12

SEQ ID NO: 99           moltype = AA  length = 13
FEATURE                 Location/Qualifiers
source                  1..13
                        mol_type = protein
                        organism = Gallus gallus
SEQUENCE: 99
PPPVVVTLPG PIL                                                   13

SEQ ID NO: 100          moltype = AA  length = 15
FEATURE                 Location/Qualifiers
source                  1..15
                        mol_type = protein
                        organism = Gallus gallus
SEQUENCE: 100
GVPISSGGFG ISGLG                                                 15

SEQ ID NO: 101          moltype = AA  length = 13
FEATURE                 Location/Qualifiers
source                  1..13
                        mol_type = protein
                        organism = Gallus gallus
SEQUENCE: 101
VIQPSPVVVT LPG                                                   13

SEQ ID NO: 102          moltype = AA  length = 15
FEATURE                 Location/Qualifiers
source                  1..15
                        mol_type = protein
                        organism = Gallus gallus
SEQUENCE: 102
AVGSSTSAAV GSILS                                                 15

SEQ ID NO: 103          moltype = AA  length = 15
FEATURE                 Location/Qualifiers
source                  1..15
                        mol_type = protein
                        organism = Gallus gallus
SEQUENCE: 103
TAVGSSTSAA VGSIL                                                 15

SEQ ID NO: 104          moltype = AA  length = 14
FEATURE                 Location/Qualifiers
source                  1..14
                        mol_type = protein
                        organism = Gallus gallus
SEQUENCE: 104
SGGFGISGLG SRFS                                                  14

SEQ ID NO: 105          moltype = AA  length = 13
FEATURE                 Location/Qualifiers
```

-continued

```
source                1..13
                      mol_type = protein
                      organism = Gallus gallus
SEQUENCE: 105
VVVTLPGPIL SSF                                                        13

SEQ ID NO: 106        moltype = AA  length = 13
FEATURE               Location/Qualifiers
source                1..13
                      mol_type = protein
                      organism = Gallus gallus
SEQUENCE: 106
PPPVVVTFPG PIL                                                        13

SEQ ID NO: 107        moltype = AA  length = 14
FEATURE               Location/Qualifiers
source                1..14
                      mol_type = protein
                      organism = Gallus gallus
SEQUENCE: 107
GLGGFGWSGL GRGL                                                       14

SEQ ID NO: 108        moltype = AA  length = 13
FEATURE               Location/Qualifiers
source                1..13
                      mol_type = protein
                      organism = Gallus gallus
SEQUENCE: 108
VTLPGPILSS FPQ                                                        13

SEQ ID NO: 109        moltype = AA  length = 14
FEATURE               Location/Qualifiers
source                1..14
                      mol_type = protein
                      organism = Gallus gallus
SEQUENCE: 109
AVGSILSEEG VPIS                                                       14

SEQ ID NO: 110        moltype = AA  length = 14
FEATURE               Location/Qualifiers
source                1..14
                      mol_type = protein
                      organism = Gallus gallus
SEQUENCE: 110
SLGLGGFGWS GLGR                                                       14

SEQ ID NO: 111        moltype = AA  length = 14
FEATURE               Location/Qualifiers
source                1..14
                      mol_type = protein
                      organism = Gallus gallus
SEQUENCE: 111
PSPVVVTLPG PILS                                                       14

SEQ ID NO: 112        moltype = AA  length = 13
FEATURE               Location/Qualifiers
source                1..13
                      mol_type = protein
                      organism = Gallus gallus
SEQUENCE: 112
SRVVIQPSPV VVT                                                        13

SEQ ID NO: 113        moltype = AA  length = 15
FEATURE               Location/Qualifiers
source                1..15
                      mol_type = protein
                      organism = Gallus gallus
SEQUENCE: 113
SGGFGISGLG SRFSG                                                      15

SEQ ID NO: 114        moltype = AA  length = 14
FEATURE               Location/Qualifiers
source                1..14
                      mol_type = protein
                      organism = Gallus gallus
SEQUENCE: 114
PPPVVVTLPG PILS                                                       14

SEQ ID NO: 115        moltype = AA  length = 14
```

```
FEATURE                 Location/Qualifiers
source                  1..14
                        mol_type = protein
                        organism = Gallus gallus
SEQUENCE: 115
VAIQPPPVVV TLPG                                                     14

SEQ ID NO: 116          moltype = AA  length = 15
FEATURE                 Location/Qualifiers
source                  1..15
                        mol_type = protein
                        organism = Gallus gallus
SEQUENCE: 116
PISSGGFGIS GLGSR                                                    15

SEQ ID NO: 117          moltype = AA  length = 13
FEATURE                 Location/Qualifiers
source                  1..13
                        mol_type = protein
                        organism = Gallus gallus
SEQUENCE: 117
PIVDVAEALL HVK                                                      13

SEQ ID NO: 118          moltype = AA  length = 14
FEATURE                 Location/Qualifiers
source                  1..14
                        mol_type = protein
                        organism = Gallus gallus
SEQUENCE: 118
VVIQPSPVVV TLPG                                                     14

SEQ ID NO: 119          moltype = AA  length = 13
FEATURE                 Location/Qualifiers
source                  1..13
                        mol_type = protein
                        organism = Gallus gallus
SEQUENCE: 119
RVVIQPSPVV VTL                                                      13

SEQ ID NO: 120          moltype = AA  length = 16
FEATURE                 Location/Qualifiers
source                  1..16
                        mol_type = protein
                        organism = Gallus gallus
SEQUENCE: 120
TAVGSSTSAA VGSILS                                                   16

SEQ ID NO: 121          moltype = AA  length = 14
FEATURE                 Location/Qualifiers
source                  1..14
                        mol_type = protein
                        organism = Gallus gallus
SEQUENCE: 121
PPPVVVTFPG PILS                                                     14

SEQ ID NO: 122          moltype = AA  length = 15
FEATURE                 Location/Qualifiers
source                  1..15
                        mol_type = protein
                        organism = Gallus gallus
SEQUENCE: 122
SLGLGGFGWS GLGRG                                                    15

SEQ ID NO: 123          moltype = AA  length = 14
FEATURE                 Location/Qualifiers
source                  1..14
                        mol_type = protein
                        organism = Gallus gallus
SEQUENCE: 123
VVVTLPGPIL SSFP                                                     14

SEQ ID NO: 124          moltype = AA  length = 14
FEATURE                 Location/Qualifiers
source                  1..14
                        mol_type = protein
                        organism = Gallus gallus
SEQUENCE: 124
PVVVTLPGPI LSSF                                                     14
```

```
SEQ ID NO: 125          moltype = AA  length = 15
FEATURE                 Location/Qualifiers
source                  1..15
                        mol_type = protein
                        organism = Gallus gallus
SEQUENCE: 125
AAVGSILSEE GVPIS                                                   15

SEQ ID NO: 126          moltype = AA  length = 15
FEATURE                 Location/Qualifiers
source                  1..15
                        mol_type = protein
                        organism = Gallus gallus
SEQUENCE: 126
SAAVGSILSE EGVPI                                                   15

SEQ ID NO: 127          moltype = AA  length = 16
FEATURE                 Location/Qualifiers
source                  1..16
                        mol_type = protein
                        organism = Gallus gallus
SEQUENCE: 127
EGVPISSGGF GISGLG                                                  16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                    14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                   15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                  16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                   15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                    14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                    14

SEQ ID NO: 134          moltype = AA  length = 15
FEATURE                 Location/Qualifiers
source                  1..15
                        mol_type = protein
                        organism = Gallus gallus
SEQUENCE: 134
VVIQPSPVVV TLPGP                                                   15
```

```
SEQ ID NO: 135          moltype = AA  length = 14
FEATURE                 Location/Qualifiers
source                  1..14
                        mol_type = protein
                        organism = Gallus gallus
SEQUENCE: 135
RVVIQPSPVV VTLP                                                   14

SEQ ID NO: 136          moltype = AA  length = 16
FEATURE                 Location/Qualifiers
source                  1..16
                        mol_type = protein
                        organism = Gallus gallus
SEQUENCE: 136
SAAVGSILSE EGVPIS                                                 16

SEQ ID NO: 137          moltype = AA  length = 15
FEATURE                 Location/Qualifiers
source                  1..15
                        mol_type = protein
                        organism = Gallus gallus
SEQUENCE: 137
PVVVTLPGPI LSSFP                                                  15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                  15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                                17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                                 16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                                17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                                17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                                 16

SEQ ID NO: 144          moltype = AA  length = 19
FEATURE                 Location/Qualifiers
source                  1..19
                        mol_type = protein
                        organism = Gallus gallus
SEQUENCE: 144
```

```
SAAVGSSLSA GSVPIGAGG                                                    19

SEQ ID NO: 145          moltype = AA  length = 17
FEATURE                 Location/Qualifiers
source                  1..17
                        mol_type = protein
                        organism = Gallus gallus
SEQUENCE: 145
GVPISSGGFG ISGLGSR                                                      17

SEQ ID NO: 146          moltype = AA  length = 15
FEATURE                 Location/Qualifiers
source                  1..15
                        mol_type = protein
                        organism = Gallus gallus
SEQUENCE: 146
VVVTLPGPIL SSFPQ                                                        15

SEQ ID NO: 147          moltype = AA  length = 15
FEATURE                 Location/Qualifiers
source                  1..15
                        mol_type = protein
                        organism = Gallus gallus
SEQUENCE: 147
RVVIQPSPVV VTLPG                                                        15

SEQ ID NO: 148          moltype = AA  length = 15
FEATURE                 Location/Qualifiers
source                  1..15
                        mol_type = protein
                        organism = Gallus gallus
SEQUENCE: 148
SRVVIQPSPV VVTLP                                                        15

SEQ ID NO: 149          moltype = AA  length = 16
FEATURE                 Location/Qualifiers
source                  1..16
                        mol_type = protein
                        organism = Gallus gallus
SEQUENCE: 149
PSPVVVTLPG PILSSF                                                       16

SEQ ID NO: 150          moltype = AA  length = 16
FEATURE                 Location/Qualifiers
source                  1..16
                        mol_type = protein
                        organism = Gallus gallus
SEQUENCE: 150
AIQPPPVVVT LPGPIL                                                       16

SEQ ID NO: 151          moltype = AA  length = 16
FEATURE                 Location/Qualifiers
source                  1..16
                        mol_type = protein
                        organism = Gallus gallus
SEQUENCE: 151
IQPSPVVVTL PGPILS                                                       16

SEQ ID NO: 152          moltype = AA  length = 16
FEATURE                 Location/Qualifiers
source                  1..16
                        mol_type = protein
                        organism = Gallus gallus
SEQUENCE: 152
VIQPSPVVVT LPGPIL                                                       16

SEQ ID NO: 153          moltype = AA  length = 17
FEATURE                 Location/Qualifiers
source                  1..17
                        mol_type = protein
                        organism = Gallus gallus
SEQUENCE: 153
VPISSGGFGI SGLGSRF                                                      17

SEQ ID NO: 154          moltype = AA  length = 16
FEATURE                 Location/Qualifiers
source                  1..16
                        mol_type = protein
                        organism = Gallus gallus
```

```
SEQUENCE: 154
SRVVIQPSPV VVTLPG                                                  16

SEQ ID NO: 155          moltype = AA  length = 17
FEATURE                 Location/Qualifiers
source                  1..17
                        mol_type = protein
                        organism = Gallus gallus
SEQUENCE: 155
SILSEEGVPI SSGGFGI                                                 17

SEQ ID NO: 156          moltype = AA  length = 16
FEATURE                 Location/Qualifiers
source                  1..16
                        mol_type = protein
                        organism = Gallus gallus
SEQUENCE: 156
PVVVTLPGPI LSSFPQ                                                  16

SEQ ID NO: 157          moltype = AA  length = 16
FEATURE                 Location/Qualifiers
source                  1..16
                        mol_type = protein
                        organism = Gallus gallus
SEQUENCE: 157
RVVIQPSPVV VTLPGP                                                  16

SEQ ID NO: 158          moltype = AA  length = 18
FEATURE                 Location/Qualifiers
source                  1..18
                        mol_type = protein
                        organism = Gallus gallus
SEQUENCE: 158
SAAVGSILSE EGVPISSG                                                18

SEQ ID NO: 159          moltype = AA  length = 16
FEATURE                 Location/Qualifiers
source                  1..16
                        mol_type = protein
                        organism = Gallus gallus
SEQUENCE: 159
VVVTLPGPIL SSFPQN                                                  16

SEQ ID NO: 160          moltype = AA  length = 18
FEATURE                 Location/Qualifiers
source                  1..18
                        mol_type = protein
                        organism = Gallus gallus
SEQUENCE: 160
GVPISSGGFG ISGLGSRF                                                18

SEQ ID NO: 161          moltype = AA  length = 17
FEATURE                 Location/Qualifiers
source                  1..17
                        mol_type = protein
                        organism = Gallus gallus
SEQUENCE: 161
PSPVVVTLPG PILSSFP                                                 17

SEQ ID NO: 162          moltype = AA  length = 17
FEATURE                 Location/Qualifiers
source                  1..17
                        mol_type = protein
                        organism = Gallus gallus
SEQUENCE: 162
VAIQPPPVVV TLPGPIL                                                 17

SEQ ID NO: 163          moltype = AA  length = 17
FEATURE                 Location/Qualifiers
source                  1..17
                        mol_type = protein
                        organism = Gallus gallus
SEQUENCE: 163
VIQPSPVVVT LPGPILS                                                 17

SEQ ID NO: 164          moltype = AA  length = 17
FEATURE                 Location/Qualifiers
source                  1..17
                        mol_type = protein
```

```
                        organism = Gallus gallus
SEQUENCE: 164
VVIQPSPVVV TLPGPIL                                              17

SEQ ID NO: 165          moltype = AA  length = 17
FEATURE                 Location/Qualifiers
source                  1..17
                        mol_type = protein
                        organism = Gallus gallus
SEQUENCE: 165
SPVVVTLPGP ILSSFPQ                                              17

SEQ ID NO: 166          moltype = AA  length = 15
FEATURE                 Location/Qualifiers
source                  1..15
                        mol_type = protein
                        organism = Gallus gallus
SEQUENCE: 166
VILSNTKTQY SIKIH                                                15

SEQ ID NO: 167          moltype = AA  length = 17
FEATURE                 Location/Qualifiers
source                  1..17
                        mol_type = protein
                        organism = Gallus gallus
SEQUENCE: 167
SRVVIQPSPV VVTLPGP                                              17

SEQ ID NO: 168          moltype = AA  length = 17
FEATURE                 Location/Qualifiers
source                  1..17
                        mol_type = protein
                        organism = Gallus gallus
SEQUENCE: 168
DSRVVIQPSP VVVTLPG                                              17

SEQ ID NO: 169          moltype = AA  length = 17
FEATURE                 Location/Qualifiers
source                  1..17
                        mol_type = protein
                        organism = Gallus gallus
SEQUENCE: 169
PVVVTLPGPI LSSFPQN                                              17

SEQ ID NO: 170          moltype = AA  length = 17
FEATURE                 Location/Qualifiers
source                  1..17
                        mol_type = protein
                        organism = Gallus gallus
SEQUENCE: 170
RVVIQPSPVV VTLPGPI                                              17

SEQ ID NO: 171          moltype = AA  length = 19
FEATURE                 Location/Qualifiers
source                  1..19
                        mol_type = protein
                        organism = Gallus gallus
SEQUENCE: 171
GVPISSGGFG ISGLGSRFS                                            19

SEQ ID NO: 172          moltype = AA  length = 18
FEATURE                 Location/Qualifiers
source                  1..18
                        mol_type = protein
                        organism = Gallus gallus
SEQUENCE: 172
SVAIQPPPVV VTLPGPIL                                             18

SEQ ID NO: 173          moltype = AA  length = 18
FEATURE                 Location/Qualifiers
source                  1..18
                        mol_type = protein
                        organism = Gallus gallus
SEQUENCE: 173
VAIQPPPVVV TLPGPILS                                             18

SEQ ID NO: 174          moltype = AA  length = 18
FEATURE                 Location/Qualifiers
source                  1..18
```

```
                        mol_type = protein
                        organism = Gallus gallus
SEQUENCE: 174
VVIQPSPVVV TLPGPILS                                             18

SEQ ID NO: 175          moltype = AA  length = 18
FEATURE                 Location/Qualifiers
source                  1..18
                        mol_type = protein
                        organism = Gallus gallus
SEQUENCE: 175
PSPVVVTLPG PILSSFPQ                                             18

SEQ ID NO: 176          moltype = AA  length = 20
FEATURE                 Location/Qualifiers
source                  1..20
                        mol_type = protein
                        organism = Gallus gallus
SEQUENCE: 176
GVPISSGGFG ISGLGSRFSG                                           20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                             18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                             18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                             18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                             18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                             18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                            19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                            19

SEQ ID NO: 184          moltype = AA  length = 18
FEATURE                 Location/Qualifiers
```

```
source                  1..18
                        mol_type = protein
                        organism = Gallus gallus
SEQUENCE: 184
RVVIQPSPVV VTLPGPIL                                                18

SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                               19

SEQ ID NO: 186          moltype = AA  length = 21
FEATURE                 Location/Qualifiers
source                  1..21
                        mol_type = protein
                        organism = Gallus gallus
SEQUENCE: 186
SILSEEGVPI SSGGFGISGL G                                            21

SEQ ID NO: 187          moltype = AA  length = 19
FEATURE                 Location/Qualifiers
source                  1..19
                        mol_type = protein
                        organism = Gallus gallus
SEQUENCE: 187
SRVVIQPSPV VVTLPGPIL                                               19

SEQ ID NO: 188          moltype = AA  length = 19
FEATURE                 Location/Qualifiers
source                  1..19
                        mol_type = protein
                        organism = Gallus gallus
SEQUENCE: 188
RVVIQPSPVV VTLPGPILS                                               19

SEQ ID NO: 189          moltype = AA  length = 22
FEATURE                 Location/Qualifiers
source                  1..22
                        mol_type = protein
                        organism = Gallus gallus
SEQUENCE: 189
SVPIGAGGSL GLGGFGWSGL GR                                           22

SEQ ID NO: 190          moltype = AA  length = 22
FEATURE                 Location/Qualifiers
source                  1..22
                        mol_type = protein
                        organism = Gallus gallus
SEQUENCE: 190
TAVGSSTSAA VGSILSEEGV PI                                           22

SEQ ID NO: 191          moltype = AA  length = 22
FEATURE                 Location/Qualifiers
source                  1..22
                        mol_type = protein
                        organism = Gallus gallus
SEQUENCE: 191
SAAVGSILSE EGVPISSGGF GI                                           22

SEQ ID NO: 192          moltype = AA  length = 21
FEATURE                 Location/Qualifiers
source                  1..21
                        mol_type = protein
                        organism = Gallus gallus
SEQUENCE: 192
SEEGVPISSG GFGISGLGSR F                                            21

SEQ ID NO: 193          moltype = AA  length = 20
FEATURE                 Location/Qualifiers
source                  1..20
                        mol_type = protein
                        organism = Gallus gallus
SEQUENCE: 193
SRVVIQPSPV VVTLPGPILS                                              20

SEQ ID NO: 194          moltype = AA  length = 23
```

```
FEATURE                Location/Qualifiers
source                 1..23
                       mol_type = protein
                       organism = Gallus gallus
SEQUENCE: 194
SVPIGAGGSL GLGGFGWSGL GRG                                              23

SEQ ID NO: 195         moltype = AA  length = 20
FEATURE                Location/Qualifiers
source                 1..20
                       mol_type = protein
                       organism = Gallus gallus
SEQUENCE: 195
DSRVVIQPSP VVVTLPGPIL                                                  20

SEQ ID NO: 196         moltype = AA  length = 23
FEATURE                Location/Qualifiers
source                 1..23
                       mol_type = protein
                       organism = Gallus gallus
SEQUENCE: 196
TAVGSSTSAA VGSILSEEGV PIS                                              23

SEQ ID NO: 197         moltype = AA  length = 22
FEATURE                Location/Qualifiers
source                 1..22
                       mol_type = protein
                       organism = Gallus gallus
SEQUENCE: 197
LRGDVGPVGR TGEQGIAGPP GF                                               22

SEQ ID NO: 198         moltype = AA  length = 21
FEATURE                Location/Qualifiers
source                 1..21
                       mol_type = protein
                       organism = Gallus gallus
SEQUENCE: 198
SRVVIQPSPV VVTLPGPILS S                                                21

SEQ ID NO: 199         moltype = AA  length = 21
FEATURE                Location/Qualifiers
source                 1..21
                       mol_type = protein
                       organism = Gallus gallus
SEQUENCE: 199
VVIQPSPVVV TLPGPILSSF P                                                21

SEQ ID NO: 200         moltype = AA  length = 22
FEATURE                Location/Qualifiers
source                 1..22
                       mol_type = protein
                       organism = Gallus gallus
SEQUENCE: 200
GVPISSGGFG ISGLGSRFSG RR                                               22

SEQ ID NO: 201         moltype = AA  length = 24
FEATURE                Location/Qualifiers
source                 1..24
                       mol_type = protein
                       organism = Gallus gallus
SEQUENCE: 201
SVPIGAGGSL GLGGFGWSGL GRGL                                             24

SEQ ID NO: 202         moltype = AA  length = 21
FEATURE                Location/Qualifiers
source                 1..21
                       mol_type = protein
                       organism = Gallus gallus
SEQUENCE: 202
DSRVVIQPSP VVVTLPGPIL S                                                21

SEQ ID NO: 203         moltype = AA  length = 21
FEATURE                Location/Qualifiers
source                 1..21
                       mol_type = protein
                       organism = Gallus gallus
SEQUENCE: 203
VIQPSPVVVT LPGPILSSFP Q                                                21
```

```
SEQ ID NO: 204         moltype = AA  length = 24
FEATURE                Location/Qualifiers
source                 1..24
                       mol_type = protein
                       organism = Gallus gallus
SEQUENCE: 204
AVGSILSEEG VPISSGGFGI SGLG                                          24

SEQ ID NO: 205         moltype = AA  length = 21
FEATURE                Location/Qualifiers
source                 1..21
                       mol_type = protein
                       organism = Gallus gallus
SEQUENCE: 205
RVVIQPSPVV VTLPGPILSS F                                             21

SEQ ID NO: 206         moltype = AA  length = 23
FEATURE                Location/Qualifiers
source                 1..23
                       mol_type = protein
                       organism = Gallus gallus
SEQUENCE: 206
SILSEEGVPI SSGGFGISGL GSR                                           23

SEQ ID NO: 207         moltype = AA  length = 21
FEATURE                Location/Qualifiers
source                 1..21
                       mol_type = protein
                       organism = Gallus gallus
SEQUENCE: 207
IPSSVPESSF KIKGNSSSFH I                                             21

SEQ ID NO: 208         moltype = AA  length = 22
FEATURE                Location/Qualifiers
source                 1..22
                       mol_type = protein
                       organism = Gallus gallus
SEQUENCE: 208
VAIQPPPVVV TLPGPILSSF PQ                                            22

SEQ ID NO: 209         moltype = AA  length = 25
FEATURE                Location/Qualifiers
source                 1..25
                       mol_type = protein
                       organism = Gallus gallus
SEQUENCE: 209
TAVGSSTSAA VGSILSEEGV PISSG                                         25

SEQ ID NO: 210         moltype = AA  length = 22
FEATURE                Location/Qualifiers
source                 1..22
                       mol_type = protein
                       organism = Gallus gallus
SEQUENCE: 210
VVIQPSPVVV TLPGPILSSF PQ                                            22

SEQ ID NO: 211         moltype = AA  length = 23
FEATURE                Location/Qualifiers
source                 1..23
                       mol_type = protein
                       organism = Gallus gallus
SEQUENCE: 211
PSPVVVTLPG PILSSFPQNT AVG                                           23

SEQ ID NO: 212         moltype = AA  length = 20
FEATURE                Location/Qualifiers
source                 1..20
                       mol_type = protein
                       organism = Gallus gallus
SEQUENCE: 212
KENFEVLCKD GTRKPVTDAE                                               20

SEQ ID NO: 213         moltype = AA  length = 21
FEATURE                Location/Qualifiers
source                 1..21
                       mol_type = protein
                       organism = Gallus gallus
SEQUENCE: 213
SIQACKLAQS HGWGVMVSHR S                                             21
```

```
SEQ ID NO: 214          moltype = AA  length = 22
FEATURE                 Location/Qualifiers
source                  1..22
                        mol_type = protein
                        organism = Gallus gallus
SEQUENCE: 214
SRVVIQPSPV VVTLPGPILS SF                                                22

SEQ ID NO: 215          moltype = AA  length = 22
FEATURE                 Location/Qualifiers
source                  1..22
                        mol_type = protein
                        organism = Gallus gallus
SEQUENCE: 215
RVVIQPSPVV VTLPGPILSS FP                                                22

SEQ ID NO: 216          moltype = AA  length = 23
FEATURE                 Location/Qualifiers
source                  1..23
                        mol_type = protein
                        organism = Gallus gallus
SEQUENCE: 216
EQPPLCVASV SVKEPASETP AVP                                               23

SEQ ID NO: 217          moltype = AA  length = 23
FEATURE                 Location/Qualifiers
source                  1..23
                        mol_type = protein
                        organism = Gallus gallus
SEQUENCE: 217
SVAIQPPPVV VTLPGPILSS FPQ                                               23

SEQ ID NO: 218          moltype = AA  length = 26
FEATURE                 Location/Qualifiers
source                  1..26
                        mol_type = protein
                        organism = Gallus gallus
SEQUENCE: 218
SAAVGSILSE EGVPISSGGF GISGLG                                            26

SEQ ID NO: 219          moltype = AA  length = 24
FEATURE                 Location/Qualifiers
source                  1..24
                        mol_type = protein
                        organism = Gallus gallus
SEQUENCE: 219
SILSEEGVPI SSGGFGISGL GSRF                                              24

SEQ ID NO: 220          moltype = AA  length = 24
FEATURE                 Location/Qualifiers
source                  1..24
                        mol_type = protein
                        organism = Gallus gallus
SEQUENCE: 220
PSPVVVTLPG PILSSFPQNT AVGS                                              24

SEQ ID NO: 221          moltype = AA  length = 23
FEATURE                 Location/Qualifiers
source                  1..23
                        mol_type = protein
                        organism = Gallus gallus
SEQUENCE: 221
VVIQPSPVVV TLPGPILSSF PQN                                               23

SEQ ID NO: 222          moltype = AA  length = 23
FEATURE                 Location/Qualifiers
source                  1..23
                        mol_type = protein
                        organism = Gallus gallus
SEQUENCE: 222
SRVVIQPSPV VVTLPGPILS SFP                                               23

SEQ ID NO: 223          moltype = AA  length = 24
FEATURE                 Location/Qualifiers
source                  1..24
                        mol_type = protein
                        organism = Gallus gallus
SEQUENCE: 223
```

```
SSVAIQPPPV VVTLPGPILS SFPQ                                        24

SEQ ID NO: 224          moltype = AA  length = 23
FEATURE                 Location/Qualifiers
source                  1..23
                        mol_type = protein
                        organism = Gallus gallus
SEQUENCE: 224
RVVIQPSPVV VTLPGPILSS FPQ                                         23

SEQ ID NO: 225          moltype = AA  length = 25
FEATURE                 Location/Qualifiers
source                  1..25
                        mol_type = protein
                        organism = Gallus gallus
SEQUENCE: 225
SILSEEGVPI SSGGFGISGL GSRFS                                       25

SEQ ID NO: 226          moltype = AA  length = 27
FEATURE                 Location/Qualifiers
source                  1..27
                        mol_type = protein
                        organism = Gallus gallus
SEQUENCE: 226
TSAAVGSILS EEGVPISSGG FGISGLG                                     27

SEQ ID NO: 227          moltype = AA  length = 26
FEATURE                 Location/Qualifiers
source                  1..26
                        mol_type = protein
                        organism = Gallus gallus
SEQUENCE: 227
SILSEEGVPI SSGGFGISGL GSRFSG                                      26

SEQ ID NO: 228          moltype = AA  length = 24
FEATURE                 Location/Qualifiers
source                  1..24
                        mol_type = protein
                        organism = Gallus gallus
SEQUENCE: 228
SRVVIQPSPV VVTLPGPILS SFPQ                                        24

SEQ ID NO: 229          moltype = AA  length = 28
FEATURE                 Location/Qualifiers
source                  1..28
                        mol_type = protein
                        organism = Gallus gallus
SEQUENCE: 229
TAVGSSTSAA VGSILSEEGV PISSGGFG                                    28

SEQ ID NO: 230          moltype = AA  length = 28
FEATURE                 Location/Qualifiers
source                  1..28
                        mol_type = protein
                        organism = Gallus gallus
SEQUENCE: 230
STSAAVGSIL SEEGVPISSG GFGISGLG                                    28

SEQ ID NO: 231          moltype = AA  length = 24
FEATURE                 Location/Qualifiers
source                  1..24
                        mol_type = protein
                        organism = Gallus gallus
SEQUENCE: 231
RVVIQPSPVV VTLPGPILSS FPQN                                        24

SEQ ID NO: 232          moltype = AA  length = 25
FEATURE                 Location/Qualifiers
source                  1..25
                        mol_type = protein
                        organism = Gallus gallus
SEQUENCE: 232
SRVVIQPSPV VVTLPGPILS SFPQN                                       25

SEQ ID NO: 233          moltype = AA  length = 25
FEATURE                 Location/Qualifiers
source                  1..25
                        mol_type = protein
                        organism = Gallus gallus
```

```
SEQUENCE: 233
DSRVVIQPSP VVVTLPGPIL SSFPQ                                       25

SEQ ID NO: 234          moltype = AA  length = 29
FEATURE                 Location/Qualifiers
source                  1..29
                        mol_type = protein
                        organism = Gallus gallus
SEQUENCE: 234
TAVGSSTSAA VGSILSEEGV PISSGGFGI                                   29

SEQ ID NO: 235          moltype = AA  length = 29
FEATURE                 Location/Qualifiers
source                  1..29
                        mol_type = protein
                        organism = Gallus gallus
SEQUENCE: 235
SAAVGSILSE EGVPISSGGF GISGLGSRF                                   29

SEQ ID NO: 236          moltype = AA  length = 24
FEATURE                 Location/Qualifiers
source                  1..24
                        mol_type = protein
                        organism = Gallus gallus
SEQUENCE: 236
VEQLVNLQHL DVAYNLLLEH AQLA                                        24

SEQ ID NO: 237          moltype = AA  length = 28
FEATURE                 Location/Qualifiers
source                  1..28
                        mol_type = protein
                        organism = Gallus gallus
SEQUENCE: 237
SVAIQPPPVV VTLPGPILSS FPQSTAVG                                    28

SEQ ID NO: 238          moltype = AA  length = 28
FEATURE                 Location/Qualifiers
source                  1..28
                        mol_type = protein
                        organism = Gallus gallus
SEQUENCE: 238
SILSEEGVPI SSGGFGISGL GSRFSGRR                                    28

SEQ ID NO: 239          moltype = AA  length = 30
FEATURE                 Location/Qualifiers
source                  1..30
                        mol_type = protein
                        organism = Gallus gallus
SEQUENCE: 239
TSAAVGSILS EEGVPISSGG FGISGLGSRF                                  30

SEQ ID NO: 240          moltype = AA  length = 29
FEATURE                 Location/Qualifiers
source                  1..29
                        mol_type = protein
                        organism = Gallus gallus
SEQUENCE: 240
SSVAIQPPPV VVTLPGPILS SFPQSTAVG                                   29

SEQ ID NO: 241          moltype = AA  length = 31
FEATURE                 Location/Qualifiers
source                  1..31
                        mol_type = protein
                        organism = Gallus gallus
SEQUENCE: 241
STSAAVGSIL SEEGVPISSG GFGISGLGSR F                                31

SEQ ID NO: 242          moltype = AA  length = 31
FEATURE                 Location/Qualifiers
source                  1..31
                        mol_type = protein
                        organism = Gallus gallus
SEQUENCE: 242
PSPVVVTLPG PILSSFPQNT AVGSSTSAAV G                                31

SEQ ID NO: 243          moltype = AA  length = 33
FEATURE                 Location/Qualifiers
source                  1..33
                        mol_type = protein
```

```
                         organism = Gallus gallus
SEQUENCE: 243
TAVGSSTSAA VGSILSEEGV PISSGGFGIS GLG                                   33

SEQ ID NO: 244           moltype = AA  length = 31
FEATURE                  Location/Qualifiers
source                   1..31
                         mol_type = protein
                         organism = Gallus gallus
SEQUENCE: 244
AVGSILSEEG VPISSGGFGI SGLGSRFSGR R                                     31

SEQ ID NO: 245           moltype = AA  length = 27
FEATURE                  Location/Qualifiers
source                   1..27
                         mol_type = protein
                         organism = Gallus gallus
SEQUENCE: 245
NKVLVHCAMG RSRSATLVLA YLMIYKN                                          27

SEQ ID NO: 246           moltype = AA  length = 32
FEATURE                  Location/Qualifiers
source                   1..32
                         mol_type = protein
                         organism = Gallus gallus
SEQUENCE: 246
SSVAIQPPPV VVTLPGPILS SFPQSTAVGS TA                                    32

SEQ ID NO: 247           moltype = AA  length = 32
FEATURE                  Location/Qualifiers
source                   1..32
                         mol_type = protein
                         organism = Gallus gallus
SEQUENCE: 247
AAVGSILSEE GVPISSGGFG ISGLGSRFSG RR                                    32

SEQ ID NO: 248           moltype = AA  length = 35
FEATURE                  Location/Qualifiers
source                   1..35
                         mol_type = protein
                         organism = Gallus gallus
SEQUENCE: 248
TAVGSSTSAA VGSILSEEGV PISSGGFGIS GLGSR                                 35

SEQ ID NO: 249           moltype = AA  length = 33
FEATURE                  Location/Qualifiers
source                   1..33
                         mol_type = protein
                         organism = Gallus gallus
SEQUENCE: 249
SAAVGSILSE EGVPISSGGF GISGLGSRFS GRR                                   33

SEQ ID NO: 250           moltype = AA  length = 34
FEATURE                  Location/Qualifiers
source                   1..34
                         mol_type = protein
                         organism = Gallus gallus
SEQUENCE: 250
PSPVVVTLPG PILSSFPQNT AVGSSTSAAV GSIL                                  34

SEQ ID NO: 251           moltype = AA  length = 35
FEATURE                  Location/Qualifiers
source                   1..35
                         mol_type = protein
                         organism = Gallus gallus
SEQUENCE: 251
PSPVVVTLPG PILSSFPQNT AVGSSTSAAV GSILS                                 35

SEQ ID NO: 252           moltype = AA  length = 36
FEATURE                  Location/Qualifiers
source                   1..36
                         mol_type = protein
                         organism = Gallus gallus
SEQUENCE: 252
TAVGSSTSAA VGSILSEEGV PISSGGFGIS GLGSRF                                36

SEQ ID NO: 253           moltype = AA  length = 29
FEATURE                  Location/Qualifiers
source                   1..29
```

-continued

```
                    mol_type = protein
                    organism = Gallus gallus
SEQUENCE: 253
RPRVYLHCTN PRHPKYREGD VTLFALNLS                              29
```